W. COURTENAY.
Martingale-Ring.
No. 198,534. Patented Dec. 25, 1877.
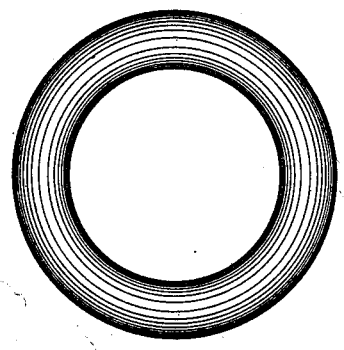
WITNESSES
INVENTOR
William Courtenay
By his Attorneys.

UNITED STATES PATENT OFFICE.

WILLIAM COURTENAY, OF NEW YORK, N. Y.

IMPROVEMENT IN MARTINGALE-RINGS.

Specification forming part of Letters Patent No. 198,534, dated December 25, 1877; application filed May 18, 1877.

*To all whom it may concern:*

Be it known that I, WILLIAM COURTENAY, of the city, county, and State of New York, have invented a new and Improved Method of Manufacturing Martingale-Rings, of which the following is a specification:

The object of my invention is to secure a strong, durable martingale-ring, capable of resisting the action of heat and moisture, as well as of acids and oils, which end I attain by forming it of vulcanized fiber, which material, although but recently discovered, is now well known in the arts; and consists of vegetable fiber treated with chloride of zinc, in accordance with the specifications of United States Letters Patent No. 113,454, dated April 4, 1871, and No. 120,380, dated October 31, 1871.

The accompanying drawing represents a view of one of my improved rings, which are made by winding the vulcanized fiber, in its pulpy state, upon a mandrel until a tube is formed of a thickness greatly exceeding that of the ring to be formed therefrom.

These tubes are dried upon the mandrel, and then passed endwise through rolls under heavy pressure, which consolidates the material, while increasing the length of the tube.

The tubes are then placed in a lathe, cut into sections, and the rings turned and polished in well-known ways.

This constitutes my method of manufacturing my rings, which I believe is peculiar, and not applicable to the manufacture of any other martingale-rings. The mandrel, rolls, and lathe employed are of ordinary construction.

I have discovered, and demonstrated by experiment, that rings made in this manner and of this material combine, in a high degree, the qualities of strength, lightness, elasticity, durability, imperviousness to oils and acids, and capacity of resisting the action of heat and moisture, and can be made of any color desired.

It is obvious that the rings, instead of being circular, might be made polygonal in form, and with flattened surfaces, ornamented in the process of turning.

I am aware that vulcanized fiber has heretofore been applied to various purposes in the arts, and therefore do not broadly claim forming articles of vulcanized fiber; but,

Having thus described my improvement, what I claim therein as new, and desire to secure by Letters Patent, is—

The method herein described of manufacturing martingale-rings of vulcanized fiber, which consists in winding it in its pulpy state upon a mandrel until a large tube is formed, then drying it thereupon, passing it endwise through rolls under heavy pressure, and then dividing, turning, and polishing.

In testimony whereof I have hereunto subscribed my name.

W. COURTENAY.

Witnesses:
 FRANCIS P. BURKE,
 GEO. WAGNER.